March 8, 1927. 1,619,978
J. H. HUNT
CONTROL OF ENGINE OIL HEATERS
Filed June 8, 1925
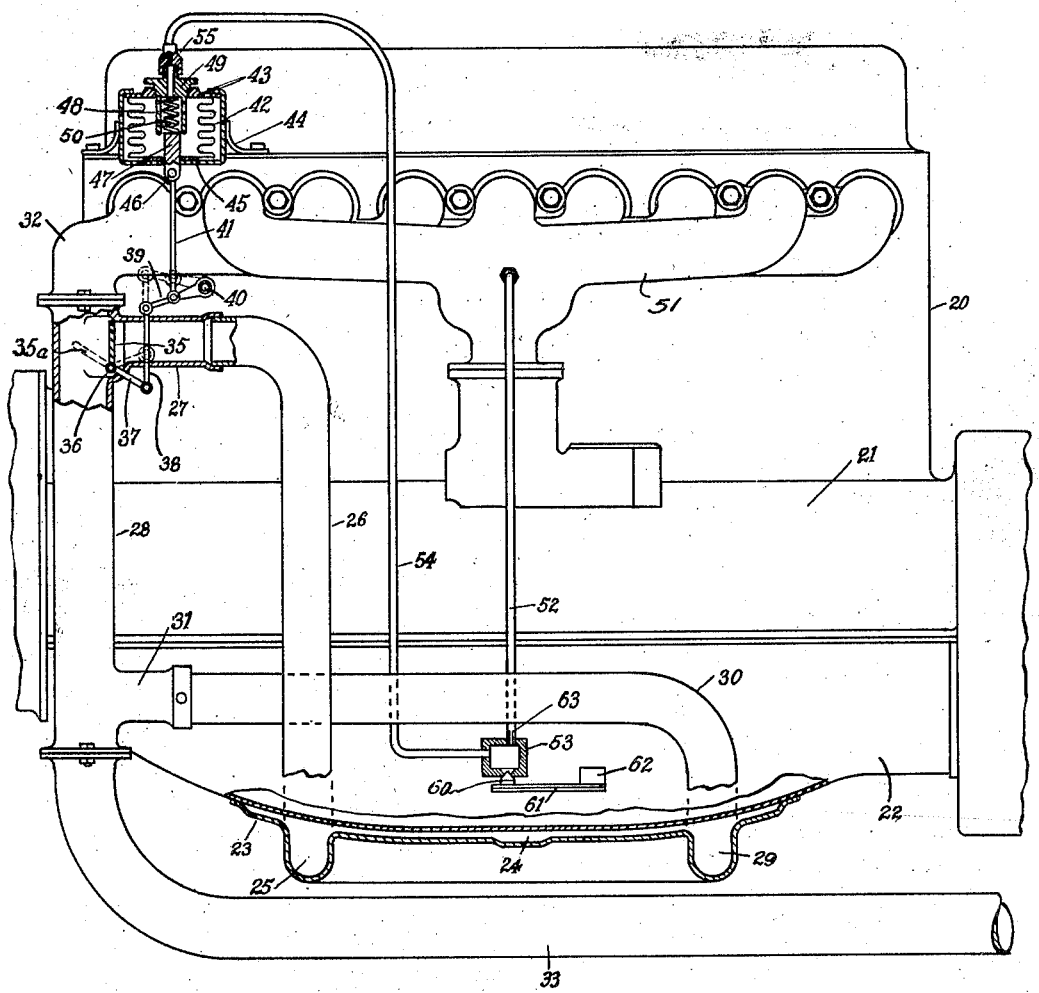
Inventor
John H. Hunt
By Spencer Sewall & Hardman
Attorney Patented Mar. 8, 1927.

1,619,978

UNITED STATES PATENT OFFICE.

JOHN H. HUNT, OF DAYTON, OHIO, ASSIGNOR TO GENERAL MOTORS RESEARCH CORPORATION, OF DAYTON, OHIO, A CORPORATION OF DELAWARE.

CONTROL OF ENGINE-OIL HEATERS.

Application filed June 8, 1925. Serial No. 35,611.

This invention relates to an apparatus for heating lubricating oil, especially oil used in internal-combustion engines for automotive vehicles.

One of the objects of the invention is to heat the oil in the engine crankcase quickly when starting the engine, especially in cold weather.

In carrying out this object, means are provided for utilizing heat from a fluid heated by the engine, such as the engine exhaust, to heat the oil in the crankcase. The operation of the engine causes some of the engine-heated fluid to flow through a duct having walls in contact with the oil in the crankcase until the temperature of the oil has attained a certain degree. Then the flow of engine-heated fluid through the oil-heating duct is automatically discontinued in order that the oil will not be overheated by the operation of the engine.

Further objects and advantages will be apparent from the following description, reference being had to the accompanying drawings, wherein a preferred form of the present invention is clearly shown.

The figure of the drawing is an elevation of an internal-combustion engine provided with apparatus made in accordance with this invention, portions of which are shown in section.

Referring to the drawings, 20 designates an internal-combustion engine provided with a crankcase 21 having its lower side covered by an oil pan 22 which receives a quantity of lubricating oil. The pan 22 is heated by exhaust from the engine. This is accomplished by a heater 23 secured to the under side of the oil pan 22 and providing a passage 24 which is relatively shallow but is co-extensive with the major portion of the oil pan. The inlet passage 25 of the heater is connected by a pipe 26 with a branch 27 of the exhaust pipe section 28. The outlet of the passage 29 of the heater is connected by a pipe 30 with a branch 31 of the pipe 28. Pipe 28 is connected in circuit with the engine exhaust manifold 32 and the exhaust pipe 33 leading to a muffler.

In order to divert some of the exhaust gas from the manifold 32 to the heater 23 a valve 35 is connected with a shaft 36 pivoted upon the pipe 28. The shaft 36 is connected with a lever 37 which is in turn connected with a link 38 attached to a lever 39 which is pivoted at 40 upon the engine. The lever 39 is connected by a link 41 with a device which is responsive to the operation of the engine. This device comprises a flexible metal bellows 42 attached at its upper end to a stationary disk 43 which is supported by a bracket 44 upon the engine. The lower end of the bellows 42 is connected with a disk 45 carrying an eye 46 attached to the link 41. The disk 45 carries a plunger 47 adapted to move within a tube 48 which is suspended from a bushing 49 attached to the disk 43. The spring 50, which is located between the plunger 47 and the bushing 49 and within the tube 48, normally maintains the bellows 42 and the valve 35 in the position shown in. In this position the valve 35 closes the branch 27 of the pipe 28. The bellows 42 is connected with the engine intake manifold 51 by a pipe 52 connected by a valve body 53 with a pipe 54 which in turn is connected by a coupling 55 with the bushing 49 which is provided with a central passage leading from the pipe 54 into the bellows 42.

The lower wall of the valve body 53 is provided with a vent hole or opening normally closed by a valve 60 attached to a bi-metallic thermostat blade 61 supported by a bracket 62 and located in heat receiving relation to the oil in the crankcase. The pipe 52 is provided with a restriction 63 of smaller diameter than the hole in the bottom wall of the valve body 53. Therefore when valve 60 is open, the pressure in the pipe 54 will be atmospheric, although there may still be a partial vacuum in pipe 52 when the engine is operating. When the engine is cold the valve 60 is in closed position. The bellows 42 is then responsive to engine intake suction and will cause the valve 35 to move into the position 35ª shown in the drawing in dotted lines.

Some of the exhaust gas in the engine will be diverted to the heater 23 and then out through the return pipe 30 and branch 31 to the exhaust pipe 28. By using the exhaust heat of the engine the oil in the crankcase is quickly heated to a temperature to cause the oil to flow readily through the circulating system of the engine.

When the temperature of the oil in the oil pan exceeds a certain degree, the blade 61 will bow downwardly and will move the valve 60 away from the opening in the valve body 53. This will restore the pressure in the bellows 42 to atmospheric so that the spring 50 may move the valve 35 to closed position.

While the form of embodiment of the invention as herein disclosed, constitutes a preferred form, it is to be understood that other forms might be adopted, all coming within the scope of the claims which follow.

What is claimed is as follows:

1. Oil heating apparatus and control therefor for internal-combustion engines comprising, in combination, a duct for receiving a fluid heated by the operation of the engine and having a wall in contact with a body of oil to be heated, a valve for controlling the flow of fluid through said duct, a device responsive to engine suction for moving said valve into position for causing said fluid to flow through said duct, a pipe having a restriction for connecting the engine intake and device, and means responsive to oil temperature for venting the device through an opening larger than the restriction.

2. Oil heating apparatus and control therefor for internal-combustion engines comprising, in combination, a duct for receiving a fluid heated by the operation of the engine and having a wall in contact with a body of oil to be heated, a valve for controlling the flow of fluid through said duct, a device responsive to engine suction for moving said valve into position for causing said fluid to flow through said duct, a pipe having a restriction for connecting the engine intake and device, a valve normally closing an opening for venting the suction device, said opening being larger than the restriction, and a thermostat in heat receiving relation to the engine oil for operating the valve.

3. Oil heating apparatus and control therefor for internal-combustion engines comprising, in combination, a duct for receiving a fluid heated by the operation of the engine and having a wall in contact with a body of oil to be heated, a valve for controlling the flow of fluid through said duct, a device responsive to engine suction for moving said valve into position for causing said fluid to flow through said duct, a pipe having a restriction for connecting the engine intake and device, a valve normally closing an opening for venting the suction device, said opening being larger than the restriction, and a bimetallic thermostat blade supported by the oil pan in heat receiving relation to the oil therein for operating the valve.

4. An engine, a reservoir for oil adapted to lubricate the engine, an exhaust conduit having a branch in proximity to the oil in the reservoir, a valve adapted to divert exhaust fluid through the branch, means responsive to engine suction for operating the valve, said means including a conduit communicating with the engine intake, said conduit having a vent opening and a thermostatic valve influenced by the temperature of the oil in the reservoir for opening and closing said vent.

5. An engine, an exhaust conduit therefor having a valve, means operated by atmospheric pressure for moving the valve, a conduit extending from the atmospheric pressure operating means to the engine intake, said conduit having a vent opening, and means for opening or closing said vent to control the operation of said means operated by atmospheric pressure.

In testimony whereof I hereto affix my signature.

JOHN H. HUNT.